US010995619B2

(12) United States Patent
Weaver (10) Patent No.: US 10,995,619 B2
(45) Date of Patent: May 4, 2021

(54) AIRFOIL AND METHOD OF FABRICATING SAME (71) Applicant: General Electric Company, Schenectady, NY (US)

(72) Inventor: Scott Andrew Weaver, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 15/606,377

(22) Filed: May 26, 2017

(65) Prior Publication Data
US 2018/0340424 A1 Nov. 29, 2018

(51) Int. Cl.
*B33Y 80/00* (2015.01)
*F01D 5/14* (2006.01)
(Continued)

(52) U.S. Cl.
CPC ............. *F01D 5/147* (2013.01); *B22C 9/043* (2013.01); *B22C 9/10* (2013.01); *B22F 5/007* (2013.01); *B22F 5/04* (2013.01); *B22F 7/08* (2013.01); *B33Y 10/00* (2014.12); *B33Y 50/02* (2014.12); *B33Y 80/00* (2014.12); *C23C 4/08* (2013.01);
(Continued)

(58) Field of Classification Search
CPC .......... F01D 5/147; F01D 5/141; F01D 5/005; F01D 5/20; F01D 5/187; B22F 5/04; B22F 7/08; B22F 5/007; C23C 24/04; C23C 4/18; C23C 4/08; B22C 9/043; B22C 9/10; B33Y 50/02; B33Y 10/00; B33Y 80/00; F05D 2230/313; F05D 2230/211; F05D 2270/8041; F05D 2230/80; F05D 2230/30;
(Continued)

(56) References Cited

U.S. PATENT DOCUMENTS 5,822,852 A * 10/1998 Bewlay ................. B22D 19/10
29/889.1
5,913,555 A 6/1999 Richter et al.
(Continued)

FOREIGN PATENT DOCUMENTS

WO 2009143819 A1 12/2009

OTHER PUBLICATIONS

Das et al., "Direct laser fabrication of superalloy cermet abrasive turbine blade tips", Materials & Design, vol. 21, Issue: 2, pp. 63-73, Apr. 1, 2000.
Rottwinkel et al., "Crack Repair of Single Crystal Turbine Blades Using Laser Cladding Technology", Procedia CIRP, Proceedings of the 3rd International Conference in Through-life Engineering Services, vol. 22, pp. 263-267, 2014.
(Continued)

*Primary Examiner* — Ryan J. Walters
(74) *Attorney, Agent, or Firm* — Dority & Manning, P.A.

(57) ABSTRACT

A method of fabricating an airfoil includes imaging a second end of the body portion to obtain image data, casting the tip portion utilizing the image data of the second end of the body portion and coupling a first end of the tip portion to the second end of the body portion. One or more features of the tip portion align with one or more features of the body portion. The method also includes additively manufacturing a core of the tip portion utilizing the image data and forming a casting mold about the core. The tip portion is cast in the casting mold. The coupling of the tip portion to the body portion including depositing a bonding material on a first end of the tip portion. An airfoil formed by the method is also disclosed.

8 Claims, 8 Drawing Sheets

(51) Int. Cl.
  *B33Y 10/00* (2015.01)
  *B33Y 50/02* (2015.01)
  *B22C 9/10* (2006.01)
  *B22C 9/04* (2006.01)
  *C23C 4/08* (2016.01)
  *C23C 4/18* (2006.01)
  *F01D 5/18* (2006.01)
  *F01D 5/20* (2006.01)
  *C23C 24/04* (2006.01)
  *B22F 5/00* (2006.01)
  *F01D 5/00* (2006.01)
  *B22F 7/08* (2006.01)
  *B22F 5/04* (2006.01)
  *B23K 101/00* (2006.01)

(52) U.S. Cl.
  CPC .............. *C23C 4/18* (2013.01); *C23C 24/04* (2013.01); *F01D 5/005* (2013.01); *F01D 5/187* (2013.01); *F01D 5/20* (2013.01); *B23K 2101/001* (2018.08); *F05D 2230/21* (2013.01); *F05D 2230/211* (2013.01); *F05D 2230/232* (2013.01); *F05D 2230/30* (2013.01); *F05D 2230/313* (2013.01); *F05D 2230/80* (2013.01); *F05D 2240/307* (2013.01); *F05D 2270/8041* (2013.01)

(58) Field of Classification Search
  CPC ............ F05D 2230/232; F05D 2230/21; F05D 2240/307; B23K 2101/001
  See application file for complete search history.

(56) References Cited

U.S. PATENT DOCUMENTS

| | | | |
|---|---|---|---|
| 6,508,000 B2 * | 1/2003 | Burke | B23P 6/005 |
| | | | 29/889.1 |
| 6,580,000 B1 * | 6/2003 | Anderson | C07F 7/025 |
| | | | 556/470 |
| 7,591,070 B2 * | 9/2009 | Lee | B23P 6/007 |
| | | | 29/721 |
| 8,474,137 B2 | 7/2013 | Richter et al. | |
| 9,266,170 B2 | 2/2016 | Godfrey et al. | |
| 2008/0260964 A1 | 10/2008 | Bagavath-Singh et al. | |
| 2011/0264413 A1 * | 10/2011 | Stankowski | B23P 6/005 |
| | | | 703/1 |
| 2016/0024955 A1 * | 1/2016 | Amini | F01D 5/288 |
| | | | 415/200 |
| 2016/0237827 A1 | 8/2016 | Campbell et al. | |
| 2017/0009584 A1 | 1/2017 | Cui et al. | |

OTHER PUBLICATIONS

Weaver, Scott A., "Airfoil and Method of Assembling Same", U.S. Appl. No. 15/279,808, filed Sep. 29, 2016. pp. 1-25.

* cited by examiner

AIRFOIL AND METHOD OF FABRICATING SAME

BACKGROUND

The field of the disclosure relates generally to airfoils and more particularly to airfoils including a body portion and a tip portion coupled to the body portion.

At least some known airfoils include a tip portion and a body portion. Under at least some operating conditions, the tip portion and the body portion experience different loads. In at least some known airfoils, the tip portion and the body portion are assembled separately and are configured to withstand different loads and different temperatures. While the tip portion is typically configured stronger than the blade portion, after a period of time in service, the tip portion may become eroded, oxidized, and/or corroded by impingement of the hot combustion gases, or the like. Because the airfoil may be expensive to produce, repair or refurbishment of the damaged airfoil may be preferred if possible. In at least some known airfoils, the body portion of the airfoil is formed in an open-tip or tipless casting process and the tip portion is coupled to the body portion after the body portion is formed. The use of open tip or tipless turbine blade casting allows improved casting yield by reducing core shift during single-crystal directional solidification process. Reducing core shift is critical in producing high cooling efficient thin-walled turbine blades. However, subsequent to casting the body portion, one has to bond or build a blade tip on top of the tipless body portion.

Similarly, during the repair of an airfoil, the damaged tip portion may be removed, such as through grinding, to allow for a replacement tip portion to be welded or otherwise attached to the body portion. However, in both initial manufacture of the airfoil, or in repair of the airfoil, coupling the tip portion to the body portion requires that the tip portion be precisely aligned on the body portion, as well as any features, such as one or more cooling passages extending through the body portion and the tip portion. The meticulous procedure needed to align the parts is laborious, tedious and production non-friendly. For at least some known airfoils, the alignment process requires specialized equipment. For example, to assemble at least some known airfoils, the tip portion is positioned on the body portion and clamped in position. In many instances, the common cast tip can have issues with alignment of the cooling passages to an unfamiliar blade. If the tip portion and the body portion are misaligned, the airfoil has an increased risk of failure during its service life.

BRIEF DESCRIPTION

The present application is directed to a method of fabricating an airfoil, the airfoil including a tip portion and a body portion. The method includes imaging a second end of the body portion to obtain image data, casting the tip portion using the image data of the second end of the body portion and coupling a first end of the tip portion to the second end of the body portion such that the tip portion and the body portion form the airfoil.

In another embodiment of the present application, a method of fabricating an airfoil, the airfoil including a tip portion and a body portion, is provided. The method includes imaging a second end of the body portion to obtain image data and additively manufacturing a core of the tip portion utilizing the image data. Next, a casting mold is formed about the core and the tip portion is cast in the casting mold. A bonding material is nest deposited on at least one of a first end of the tip portion and a second end of the body portion. The first end of the tip portion is positioned relative to the second end of the body portion and the first end of the tip portion is coupled to the second end of the body portion such that the tip portion and the body portion form the airfoil.

In yet another embodiment of the present application, an airfoil of a rotary machine is provided. The airfoil includes a cast tip portion and a body portion. The cast tip portion comprising a first end. The cast tip portion is formed of a casting material and includes a first plurality of features. The body portion is configured to couple to the cast tip portion. The body portion comprising a second end. The second end of the body portion is configured to couple to the first end of the cast tip portion. The body portion includes a second plurality of features. The first plurality of features of the cast tip portion correspond to the second plurality of features of the body portion such that the first plurality of features and the second plurality of features are aligned. The first plurality of features of the cast tip portion are based on image data of the body portion.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

As discussed in detail below, embodiments described herein provide a method for fabricating an airfoil including a tip portion and a body portion. An image of a second end of the body portion is initially obtained and sent to an additively manufacturing system. A core of the tip portion is next additively manufactured utilizing the image data. A casting mold is formed about the core, and the tip portion is cast, using investment casting, or the like. A bonding material is next deposited on a first end of the tip portion. The first end of the tip portion is next positioned and aligned with the second end of the body portion. The tip portion and the body portion are coupled together using the bonding material to form an airfoil, such that the tip portion and the body portion form the airfoil.

In the following specification and claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein the term "fluid" includes any medium or material that flows, including, but not limited to, air.

Approximating language, as used herein throughout the specification and claims, may be applied to modify and quantitative representation that could permissibly vary without resulting in a change in the basic function to which it is related. Accordingly, a value modified by a term or terms, such as "about", "approximately", and "substantially", are note to be limited to the precise value specified. In at least some instances, the approximating language may correspond to the precision of an instrument for measuring the value. Here and throughout the specification and claims, range limitations may be combined and/or interchanged such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such a flash memory. Alternatively, a floppy disk, a compact disc—read only memory (CD-ROM), a magneto-optical disk (MOD), and/or a digital versatile disc (DVD) may also be used. In addition, in the embodiments described herein, additional input channels may be, but are not limited to, computer peripherals associated with an operator interface such as a mouse and a keyboard. Alternatively, other computer peripherals may also be used that may include, for example, but not limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Figure 1:
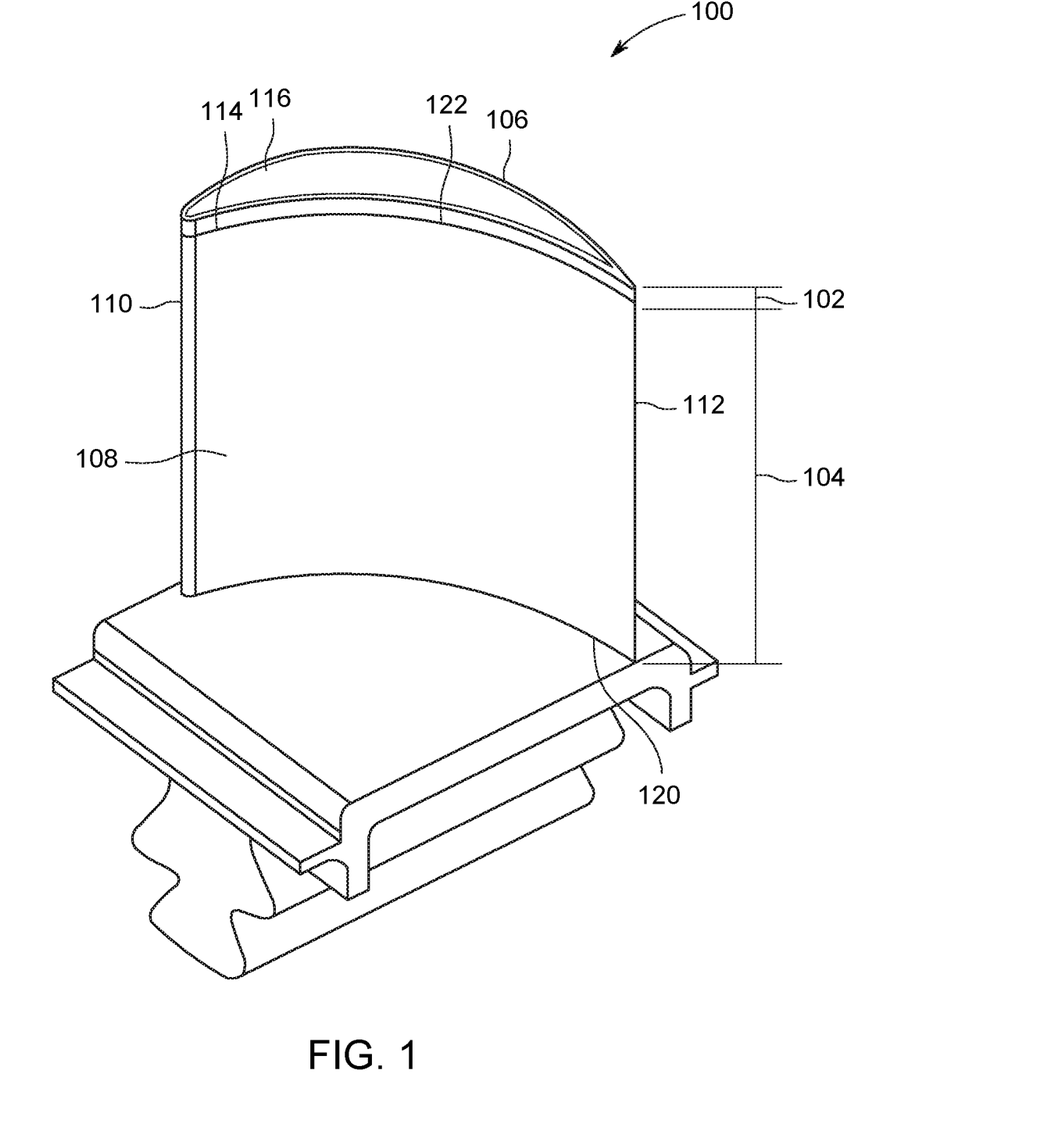
FIG. 1 is a perspective view of an exemplary airfoil including a tip portion and a body portion, in accordance with one or more embodiments shown or described herein.
Figure 2:
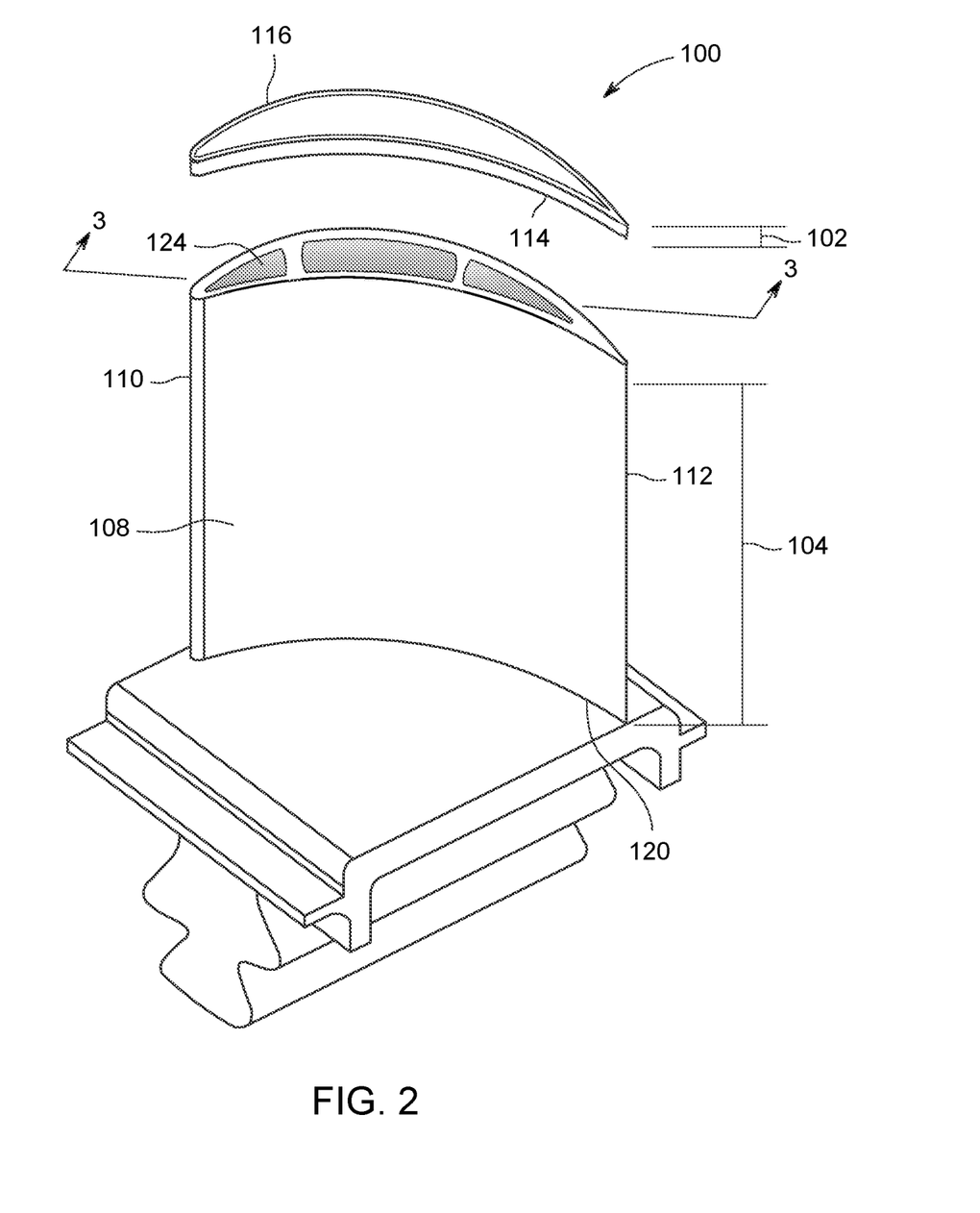
FIG. 2 is a perspective view of the airfoil shown in FIG. 1 with the tip portion spaced from the body portion, in accordance with one or more embodiments shown or described herein.
Figure 3:
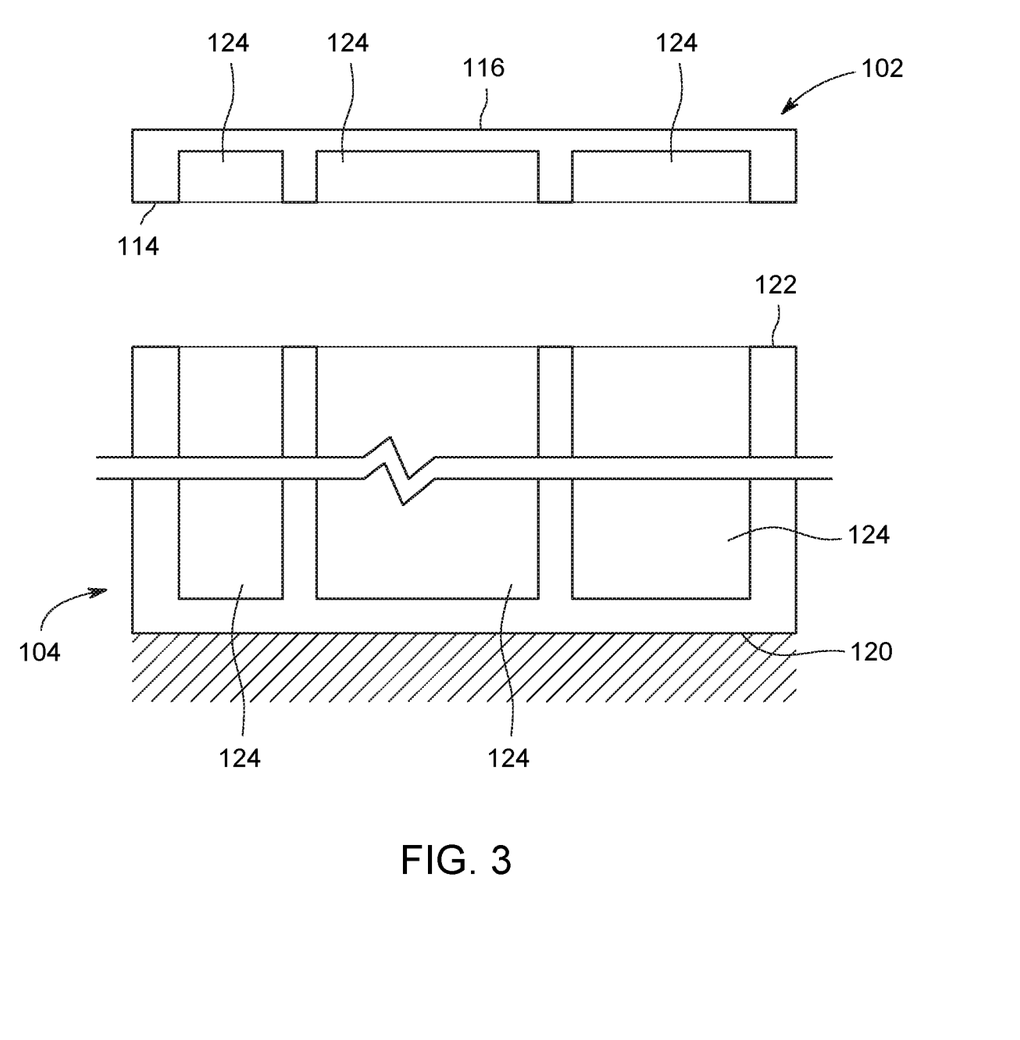
FIG. 3 is a cross-sectional view of a portion of the airfoil shown in FIG. 1 with the tip portion spaced from the body portion, in accordance with one or more embodiments shown or described herein.
Figure 4:
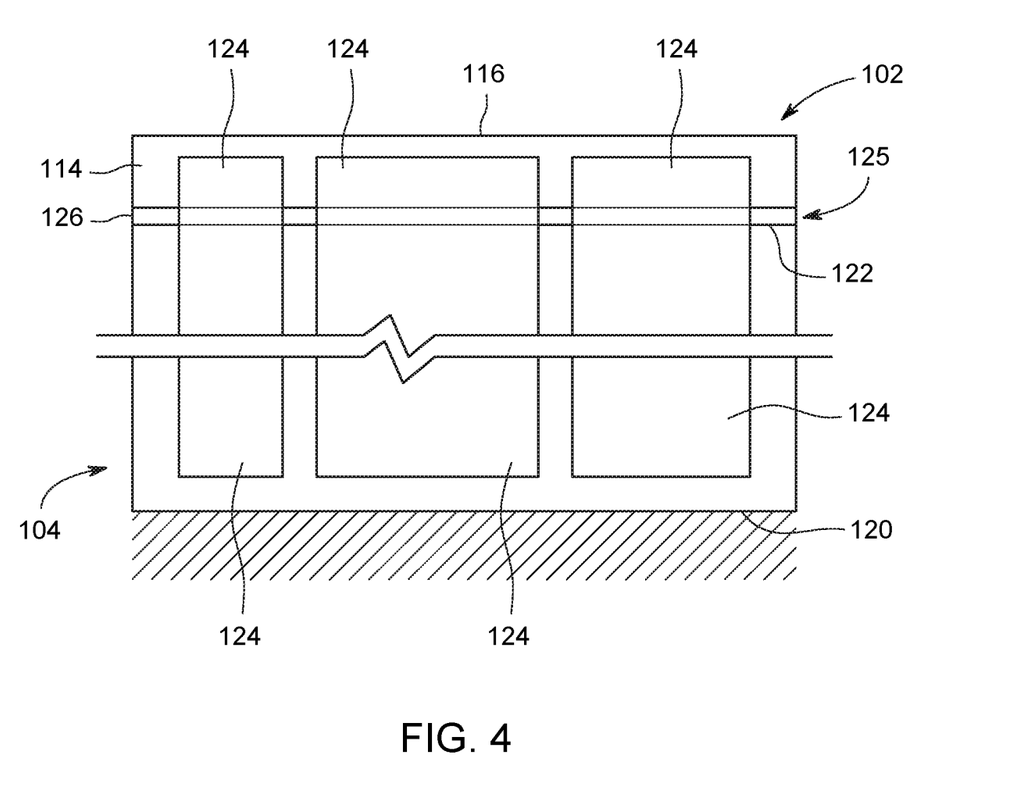
FIG. 4 is a cross-sectional view of a portion of the airfoil shown in FIG. 1 with the tip portion bonded to the body portion, in accordance with one or more embodiments shown or described herein

Referring now to the drawings, it is noted that like numerals refer to like elements throughout the several views and that the elements shown in the Figures are not drawn to scale and no dimensions should be inferred from relative sizes and distances illustrated in the Figures. Illustrated in FIG. 1 is a perspective view of an exemplary airfoil 100 including a tip portion 102 and a body portion 104. FIG. 2 is a perspective view of the airfoil 100 with the tip portion 102 spaced from the body portion 104. FIG. 3 is a cross-sectional view of a portion of the airfoil 100 with the tip portion 102 spaced from the body portion 104. FIG. 4 is a cross-sectional view of a portion of the airfoil 100 with the tip portion 102 and the body portion 104 coupled together. In the exemplary embodiment as illustrated in FIGS. 1-4, the airfoil 100 is a rotor blade for a rotary machine, such as a turbomachine, and more specifically a turbine. Examples, of turbines include gas turbine engines and steam turbines. The airfoil 100 is configured to direct fluid as the turbomachine operates. In alternative embodiments, the airfoil 100 is any airfoil. In the exemplary embodiment, the airfoil 100 further includes a suction sidewall 106 and a pressure sidewall 108. The suction sidewall 106 and the pressure sidewall 108 extend the length of the body portion 104 and the tip portion 102. In the exemplary embodiment, the suction sidewall 106 is substantially convex and the pressure sidewall 108 is substantially concave. The pressure sidewall 108 is coupled to the suction sidewall 106 at a leading edge 110 and at a trailing edge 112. In some embodiments, the airfoil 100 is coupled to a rotor (not shown) such that the trailing edge 112 is downstream from the leading edge 110. In alternative embodiments, the airfoil 100 has any configuration that enables the airfoil 100 to function as described herein.

In the exemplary embodiment, the tip portion 102 includes a first end 114 and a second end 116. The second end 116 is opposite the first end 114. The tip portion 102 further includes one or more features, such as one or more cooling passages 124, formed therein. The one or more cooling passages 124 facilitate fluid flowing through the airfoil 100, and more particularly the tip portion 102, to regulate the temperature of the airfoil 100. In alternative embodiments, the airfoil 100 includes any tip portion 102 that enables the airfoil 100 to operate as described herein.

Also, in the exemplary embodiment, the body portion 104 includes a first end 120 and a second end 122. The second end 122 is opposite the first end 120. The body portion 104 further includes one or more features, such as one or more cooling passages 124, formed therein. The one or more cooling passages 124 facilitate fluid flowing through the airfoil 100, and more particularly body portion 104, to regulate the temperature of the airfoil 100. In an embodiment, the body portion 104 may be formed as an open tip (or tip less) component. As described below, the body portion 104 is configured to align with the tip portion 102 such that the one or more cooling passages 124 in the body portion 104 align with the one or more cooling passages 124 in the tip portion 102 and wherein the one or more cooling passages 124 extend continuously through at least a portion of the airfoil 100. In alternative embodiments, the airfoil 100 includes any body portion 104 that enables the airfoil 100 to operate as described herein.

In addition, in the exemplary embodiment, the second end 122 of the body portion 104 contacts the first end 114 of the tip portion 102. The body portion 104 and the tip portion 102 are aligned such that the suction sidewall 106 and the pressure sidewall 108 extend continuously from the first end 120 of the body portion 104 to the second end 116 of the tip portion 102. The second end 122 is bonded to the first end 114 such that the body portion 104 and the tip portion 102 form the airfoil 100. In alternative embodiment, the tip portion 102 and the body portion 104 are coupled together in any manner that enables the airfoil 100 to operate as described herein.

In reference to FIGS. 3 and 4, in the exemplary embodiment, the tip portion 102 and the body portion 104 are positioned relative to one another. More particularly, in FIG. 3 the tip portion 102 is shown spaced from the body portion 104, and in FIG. 4 the tip portion 102 is shown positioned relative to the body portion 104, prior to the step of bonding them together at a joint 125. During assembly of the airfoil 100 and prior to bonding of the tip portion 102 and the body portion 104, a bonding material 126 is positioned between the first end 114 and the second end 122. In the exemplary embodiment, the bonding material 126 is configured to at least partially bond the tip portion 102 and the body portion 104. In particular, during assembly of the airfoil 100, the bonding material 126 is heated above a specified bonding temperature and at least partially bonds to each of the tip portion 102 and the body portion 104. In the exemplary embodiment, the bonding material 126 is heated to a temperature above the melting point of the bonding material 126 and below the melting point of the tip portion 102 and/or the body portion 104. In further embodiments, the bonding material 126 is configured to remain at least partially in a solid state and bond the tip portion 102 and the body portion 104 together. Accordingly, in some embodiments, the bonding material 126 is not heated to a temperature above the melting point of the bonding material 126. In alternative embodiment, the tip portion 102 and the body portion 104 are bonded together in any manner that enables the airfoil 100 (shown in FIG. 1) to operate as described herein. For example, in some embodiments, the tip portion 102 and the body portion 104 are bonded together using, without limitation, any physical vapor deposition process, such as cathodic arc, ion plasma, electron beam, sputtering, evaporation, cold spraying, and thermal spraying. In further embodiment, the bonding material 126 is omitted.

In the exemplary embodiment, the bonding material 126 includes a composition of a nickel alloy and boron. In alternative embodiments, the bonding material 126 includes any material that enables the airfoil 100 to operate as described herein. For example, in some embodiment, the bonding material 126 includes an alloy having characteristics similar to the tip portion 102 and/or the body portion 104. In further embodiments, the bonding material 126 includes a composition of structural alloy and a melting point depressant. Examples of structural alloys include, without limitations, any of the following: an iron alloy, a nickel alloy, and a cobalt alloy. Examples of melting point depressants include, without limitations, any of the following boron and silicon.

Also, in the exemplary embodiment, the bonding material 126 is deposited on the first end 114 and/or the second end 122 in a manner that enables bonding material 126 to function as described herein. For example, in some embodiments, portions of the first end 114 adjacent the one or more cooling passages 124 are free of bonding material 126.

In some embodiments, the bonding material 126 has a maximum thickness in a range of about 1 mil (0.025 millimeters (mm)) to about 10 mils (0.25 mm). In alternative embodiments, the bonding material 126 has any thickness that enables the airfoil 100 to operate as described herein.

In addition, in the exemplary embodiment, the first end 114 is substantially even, i.e., the first end 114 is flat and smooth, to facilitate deposition of the bonding material 126 on the first end 114. In some embodiments, the first end 114 is smoothed and/or flattened after formation of the tip portion 102 as described herein. In alternative embodiments, the tip portion 102 includes any first end 114 that enables the airfoil 100 to operate as described herein. For example, in some embodiments, the first end 114 is uneven.

Also, in the exemplary embodiment, the second end 122 is substantially even, i.e., the second end 122 is flat and smooth, and may facilitate deposition of the bonding material 126 on the second end 122 if desired. In some embodiments, the second end 122 is smoothed and/or flattened after formation of the body portion 104, and or removal of the tip portion 102 during a repair step. In alternative embodiments, the body portion 104 includes any second end 122 that enables the airfoil 100 to operate as described herein. For example, in some embodiments, the second end 122 is uneven and may include additional features, such as protuberances and/or recesses (not shown). In an embodiment, the recesses may form portions of the one or more cooling passages 124. Moreover, at least some features of the body portion 104 are designed to correspond with different properties of the airfoils 100. As a result, each body portion 104 has a unique second end 122, similar to a fingerprint. In alternative embodiments, the body portion 104 includes any second end 122 that enables the body portion 104 to operate as described herein. Additional information related to the inclusion of features, such as protuberances and/or recesses, and the subsequent bonding of the body portion including such features, is described in commonly assigned, U.S.

patent application Ser. No. 15/279,808, S. Weaver et al., "Airfoil and Method of Assembling Same" which is incorporated herein in its entirety.

As previously mentioned, each body portion 104 has a unique second end 122, similar to a fingerprint and as currently known in the art, a meticulous procedure is needed to align the body portions with common cast tip portions, which is laborious, tedious and production non-friendly. In addition, a common cast tip portion can have issues with alignment of the cooling passages to an unfamiliar blade. By casting custom tip portions that match the second end 122 of the airfoil 100, alignment issues can be eliminated and better airflow through the airfoil 100 is achieved.

Figure 5:
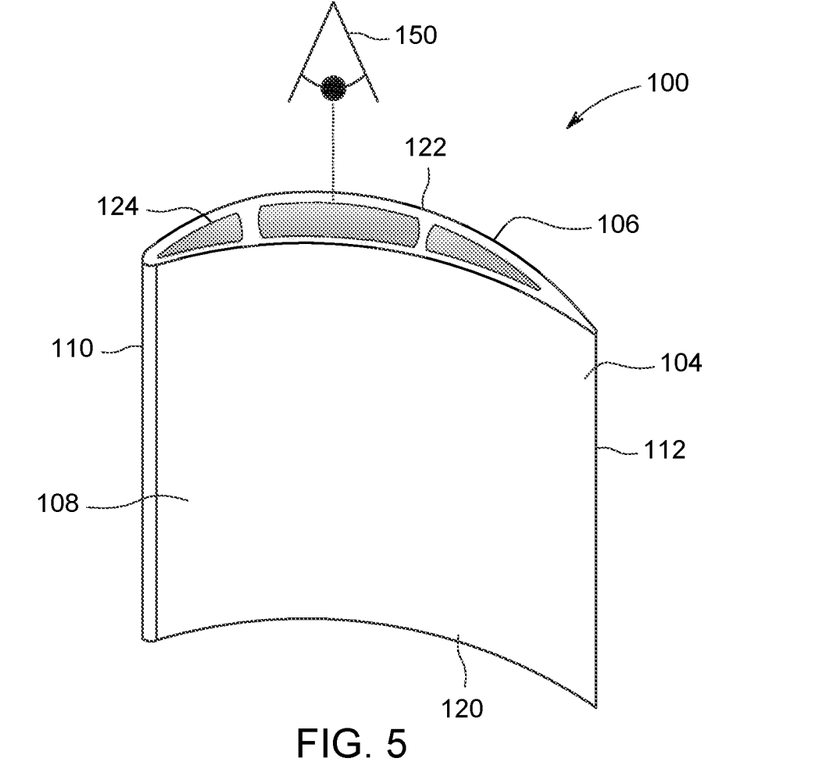
FIG. 5 is a first step in fabricating the tip portion of the airfoil shown in FIG. 1, in accordance with one or more embodiments shown or described herein.
Figure 12:
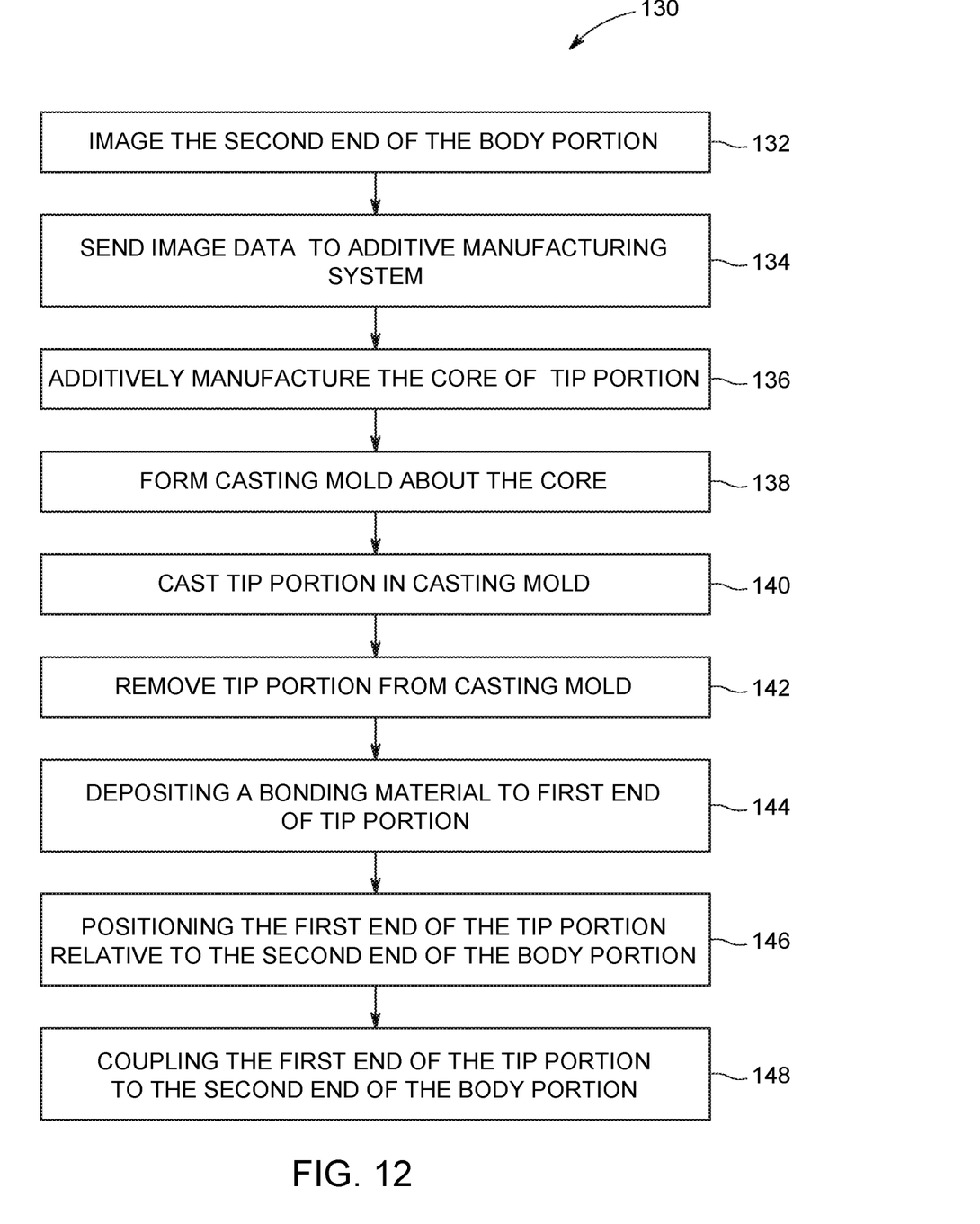
FIG. 12 is a flow chart of an exemplary method of assembling the airfoil shown in FIG. 1, in accordance with one or more embodiments shown or described herein.

Referring more specifically to FIGS. 5-12, described is a method 130 of fabricating the airfoil 100 of FIG. 1. Referring more specifically to FIGS. 5 and 12, in a first step 132, the second end 122 of the body portion 104 is imaged 150 to provide image data. The obtained image data includes the overall geometry of the body portion 104, and in particular the second end 122, as defined by the suction sidewall 106, the pressure sidewall 108, the leading edge 110, the trailing edge 112 and the one or more cooling passages 124 formed therein. In addition, any features, such as additional protuberances or recesses as previously described, are imaged. In the illustrated embodiment, the body portion 104 is an open tip, or tip less turbine blade. In another embodiment, the body portion 104 has been prepared for repair, by removing the damaged tip portion 102.

Figure 6:
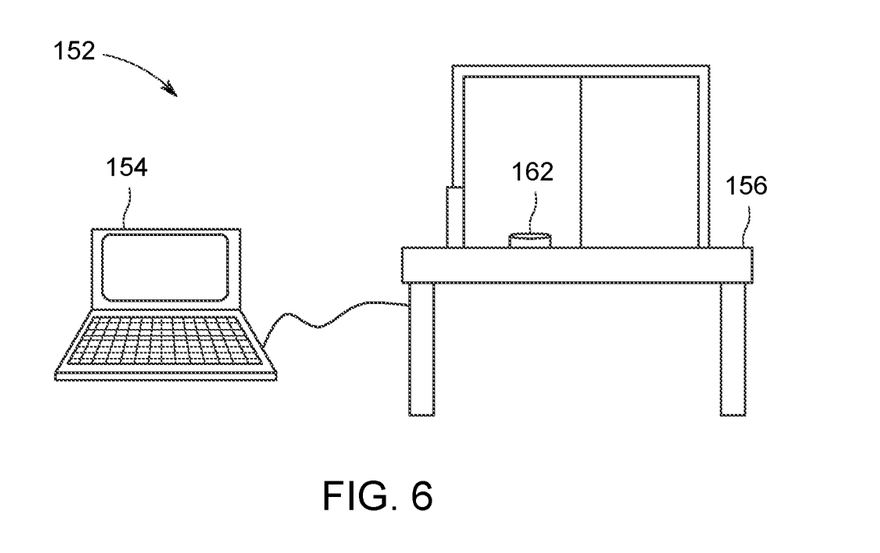
FIG. 6 is a step in fabricating the tip portion of the airfoil shown in FIG. 1, in accordance with one or more embodiments shown or described herein.

Referring more specifically to FIGS. 6 and 12, in a second step 134, the image data obtained in step 132 is sent to an additive manufacturing system 152, as schematically illustrated. The additive manufacturing system 152 includes a computing device 154 and a build platform 156. The computing device 154 includes a computer system that includes at least one processor (not shown in FIG. 6) that executes executable instructions to operate the additive manufacturing system 152 and a controller configured to control one or more components of the additive manufacturing system 152.

Subsequent to imaging 150 in a step 136, as described in FIG. 5, the image data is received by the computing device 154, processed and an electronic build file is generated to enable the additive manufacturing system 152 to build a core 162 of the tip portion 102, to define any features as previously described. The build file includes build parameters that are used to control one or more components of the additive manufacturing system 152 to build the core 162. The build parameters may include, without limitation, power, position, scan strategies and orientation of an associated laser device. In the exemplary embodiment of FIG. 6, the computing device and controller 154 are shown as combined as a single device. In other embodiments, the computing device and the controller are separate devices.

The computing device 154 may further store information associated with a melt pool based on electrical signals, which is used to facilitate controlling and refining a build process for the additive manufacturing system 152 or for a specific component built by the additive manufacturing system 152.

The controller includes any suitable type of controller that enables the additive manufacturing system 152 to function as described herein. In one embodiment, for example, the controller is a computer system that includes at least one processor and at least one memory device that executes executable instructions to control the operation of the additive manufacturing system 152 based on the obtained image data of the second end 122 of the body portion 104. The controller is configured to control one or more components of the additive manufacturing system 152 based on build parameters associated with a build file stored, for example, within the computing device 154.

Figure 7:
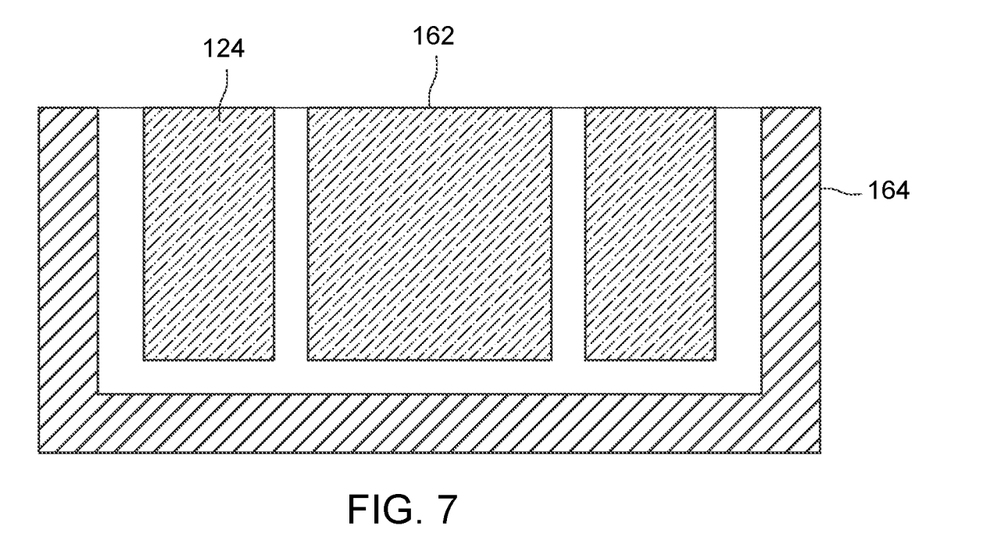
FIG. 7 is a step in fabricating the tip portion of the airfoil shown in FIG. 1, in accordance with one or more embodiments shown or described herein.

The build platform 156 includes a powdered build material that is melted and re-solidified during the additive manufacturing process to build a component, and more particularly to build the core 162. As illustrated in FIG. 7, in the exemplary embodiment, the core 162 includes varying geometry, to define features of the tip portion, and more particularly, one or more cooling passages 124 therein the tip portion 102. The final detail of the tip portion 102 matches the second end 122 of the body portion 104 from the image obtained in the first step 132. In an embodiment, the powdered build material used for the core 162 may include materials suitable for forming such components. In the illustrated embodiment, the powdered build material is comprised of a ceramic material. In other embodiments, the powdered build material includes any suitable type of powdered build material. In yet other embodiments, the powdered build material includes any suitable build material that enables the additive manufacturing system 152 to function as described, including, for example and without limitation, ceramic powders, metal-coated ceramic powders, and thermoset or thermoplastic resins.

Referring still to FIGS. 7 and 12, a casting mold 164 is next constructed about the core 162, in a step 138. In an embodiment, the casting mold 164 is formed using well known investment casting techniques. In an alternate embodiment, the casting mold 164 may be formed using other techniques that result in the formation of the casting mold 164 about the core 162.

Figure 8:
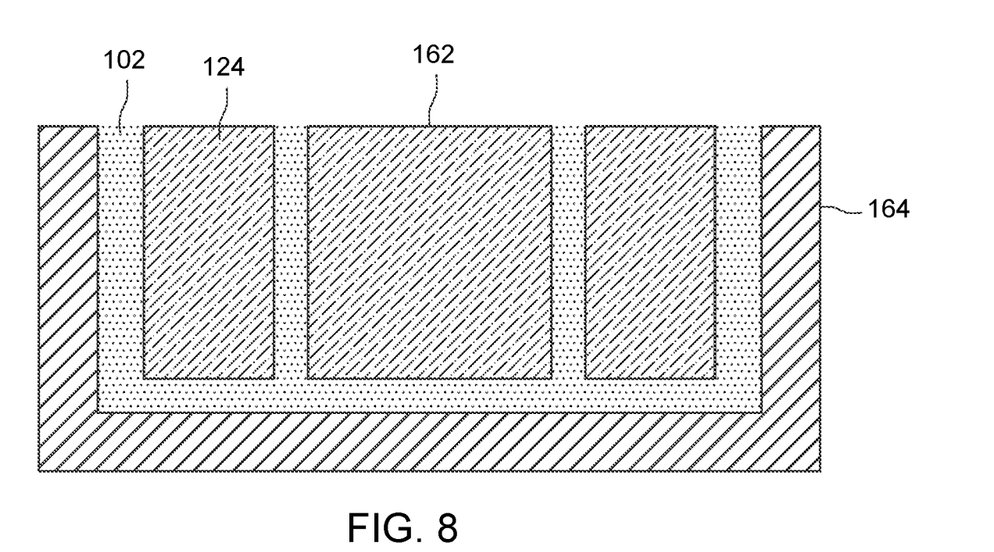
FIG. 8 is a step in fabricating the tip portion of the airfoil shown in FIG. 1, in accordance with one or more embodiments shown or described herein.

Referring now to FIGS. 8 and 12, in a step 140 the tip portion 102 is cast in the casting mold 164 to form the tip portion 102 that is unique-to-the-imaged-body portion 104. In casting the tip portion 102, an alloy material may be used that is different than that of the body portion 104. In many instances the tip portion 102 requires more environmental resistance, while the body portion 104 requires more mechanical resistance. By separately producing the tip portion 102 and the body portion 104 as described herein, different materials may be utilized while maintaining a manufacture-friendly process. To facilitate alignment of the tip portion 102 and the body portion 104, the tip portion 102 is cast to correspond to the imaged second end 122. In particular, the tip portion 102 includes one or more cooling passages 124, and additionally may include additional features as previously described. Accordingly, the first end 114 of the tip portion 102 forms a mirror image of the second end 122 of the body portion 104. As a result, the first end 114 precisely aligns with the second end 122 to facilitate coupling between the tip portion 102 and the body portion 104.

Figure 9:
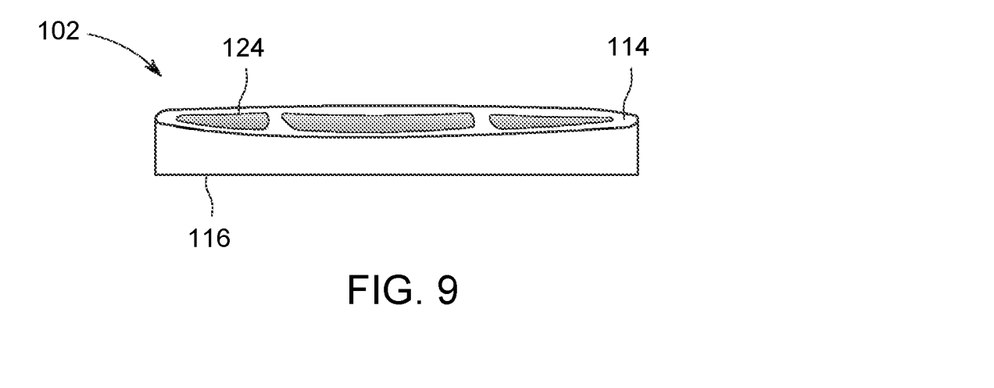
FIG. 9 is a step in fabricating the tip portion of the airfoil shown in FIG. 1, in accordance with one or more embodiments shown or described herein.
Figure 10:
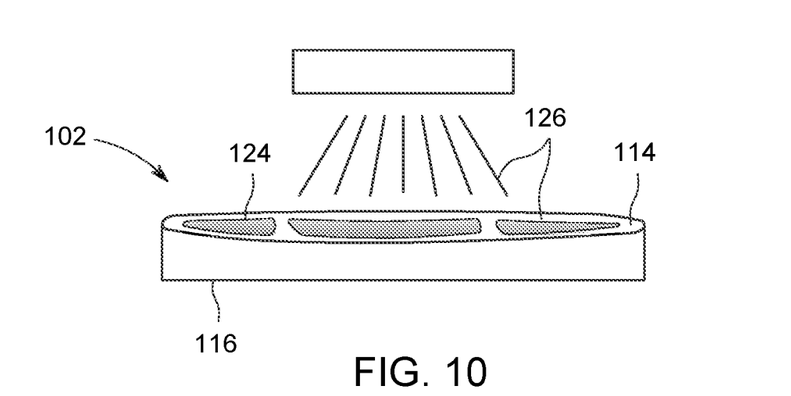
FIG. 10 is a step in fabricating the tip portion of the airfoil shown in FIG. 1, in accordance with one or more embodiments shown or described herein.

The cast tip portion 102 is next removed from the casting mold 164, in a step 142, as illustrated in FIGS. 9 and 12. As previously described, the cast tip portion 102 includes features, such as the one or more cooling passages 124, that will align with the one or more cooling passages 124 in the body portion 104. In a step 144, as best illustrated in FIGS. 10 and 12, the first end 114 of the tip portion 102 is next coated with the bonding material 126. In the exemplary embodiment, depositing 144 the bonding material 126 on the first end 114 includes a cathodic arc deposition process and/or any other deposition process. In alternative embodiments, the bonding material 126 is deposited on the tip portion 102 and/or the body portion 104 in any manner that enables the bonding material 126 to function as described herein. For example, in some embodiments, the bonding material 126 is deposited using, without limitation, any physical vapor deposition process, such as cathodic arc, ion plasma, electron beam, sputtering, evaporation, cold spraying, and thermal spraying.

Figure 11:
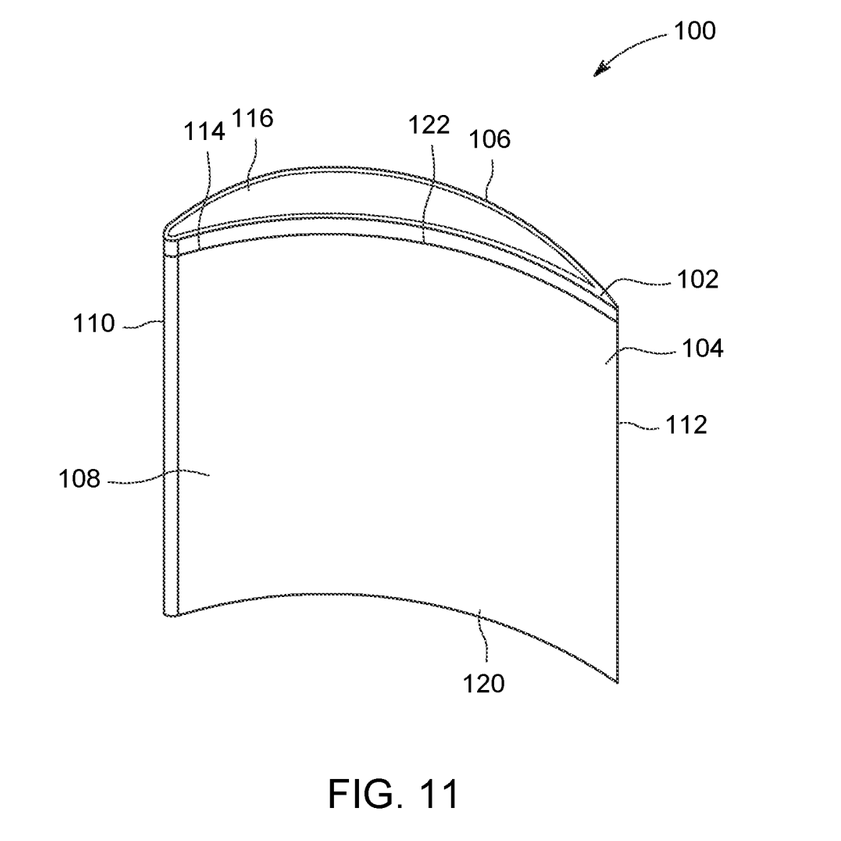
FIG. 11 is a step in the manufacture of the airfoil shown in FIG. 1, in accordance with one or more embodiments shown or described herein.

In a step 146, as best illustrated in FIGS. 11 and 12, the tip portion 102 is positioned relative to the body portion 104. More particularly, the tip portion 102 is positioned relative to the body portion 104 prior to coupling the tip portion 102 and the body portion 104 together, such that the one or more features 124 of the tip portion 102 align with one or more features 124 of the body portion 104.

In a step 148, as best illustrated in FIGS. 11 and 12, the tip portion 102 and the body portion 104 are placed together in a fixture and undergo a heat treat cycle. More particularly, the tip portion 102 and the body portion 104 undergo a primary heat treatment where the two are bonded together to form the complete airfoil 100. A second heat treatment may provide for further bonding.

FIG. 12 is a flow chart of a method 130 of assembling the airfoil 100 (shown in FIG. 1). With reference to FIGS. 5-11, the method 130 of FIG. 12 generally includes imaging 132 the second end 122 of the body portion, providing 134 the image data to an additive manufacturing system 152, additively manufacturing 136 the core 162 of the tip portion, forming 138 a casting mold 164 about the core 162, casting 140 the tip portion in the casting mold 164, removing 142 the cast tip portion 102 from the casting mold 164, applying 144 the bonding material 126 to the first end 114 of the tip portion 102, positioning the first end 120 of the tip portion 102 relative to the second end 122 of the body portion 104 prior to coupling 146, such that one or more features 124 of the tip portion 102 align with one or more features 124 of the body portion 104; and coupling 148 the first end 114 of the tip portion 102 to the second end 122 of the body portion 104.

In some embodiments, the method 130 includes preparing and/or cleaning a surface of the airfoil 100. For example, in some embodiments, excess material is removed from the tip portion 102 and/or the body portion 104 prior to bonding the portions together. In further embodiments, material, such as a thin layer of bonding material 126, is removed from the one or more cooling passages 124 after the tip portion 102 and the body portion 104 are bonded to facilitate air flowing through the one or more cooling passages 124.

Accordingly, disclosed is a method of manufacturing a cast blade tip portion from an image of the interface surface of the body portion. This disclosure describes how a custom mold made to match the top face of the body portion of a blade provides for a more manufacture-friendly process. By casting a custom tip portion that matches an open tip (or tip less) turbine blade exactly, alignment issues are eliminated and improved airflow through the airfoil is achieved. The interface of the cast tip portion to the body portion of the airfoil will be a direct match, resulting in no issue with misalignment of the core portions. The use of additive manufacturing provides that the core for the tip portion can be produced rapidly with no issues of mismatch to that of the body portion of the airfoil. In addition, once the image of the airfoil interface, and more particularly the second end of the body portion, is made, it can be stored digitally and then reused to make another tip portion for the same blade for rework should the blade need it after service. The disclosed method of imaging a body portion, and casting a tip portion based on the image data of the body portion, allows for accurate alignment of the cooling passages as well as external surface of the blade.

An exemplary technical effect of the methods and apparatus described herein includes at least one of the following: (a) decreasing time and cost required to assemble airfoils; (b) providing an airfoil tip portion that couples to an airfoil body portion; (c) providing an airfoil tip portion that aligns with an airfoil body portion; and (d) facilitating casting of an airfoil tip portion based on image data obtained of the body portion.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It should be understood that the foregoing relates only to the preferred embodiments of the present application and that numerous changes and modifications may be made herein by one of ordinary skill in the art without departing from the general spirit and scope of the invention as defined by the following claims and the equivalents thereof.

The invention claimed is:

1. A method of fabricating an airfoil, the airfoil including a tip portion and a body portion, said method comprising:
    imaging a second end of the body portion to obtain image data,
    casting the tip portion using the image data of the second end of the body portion, wherein the image data is received by a computing device, processed and an electronic build file is generated from the obtained image data to enable an additive manufacturing system to build a core of the tip portion based on the obtained image data and wherein the casting of the tip portion further includes constructing a casting mold about the core and investment casting the tip portion in the casting mold;
    positioning the first end of the tip portion relative to the second end of the body portion prior to coupling, such that one or more features of the tip portion align with one or more features of the body portion, wherein the one or more features of the tip portion and the one or more features of the body portion include cooling passages; and
    coupling a first end of the tip portion to the second end of the body portion such that the tip portion and the body portion form the airfoil.

2. The method in accordance with claim 1, wherein casting the tip portion includes casting such that the first end of the tip portion is configured to align with the second end of the body portion.

3. The method in accordance with claim 2, further comprising depositing a bonding material on at least one of the first end of the tip portion and the second end of the body portion, wherein portions of the first end of the tip portion adjacent the one or more cooling passages are free of bonding material.

4. The method in accordance with claim 1, wherein the tip portion is formed of a first alloy and the body portion is formed of a second alloy, and wherein the first alloy and the second alloy are different.

5. The method in accordance with claim 1, further comprising depositing a bonding material on at least one of the first end of the tip portion and the second end of the body portion.

6. The method in accordance with claim 5, wherein depositing a bonding material on the first end of the tip portion comprises depositing a bonding material using a physical vapor deposition process including at least one of the following: cathodic arc, ion plasma, electron beam, sputtering, evaporation, cold spraying, and thermal spraying.

7. The method in accordance with claim 1, wherein depositing a bonding material on the first end of the tip portion comprises depositing a bonding material including at least one of the following: nickel and boron.

8. The method in accordance with claim 1, wherein coupling the first end of the tip portion to the second end of the body portion includes heating the bonding material above a specified temperature, wherein the specified temperature is less than a melting point of at least one of the tip portion and the body portion.

* * * * *